(12) United States Patent
Blasius et al.

(10) Patent No.: US 12,077,658 B2
(45) Date of Patent: Sep. 3, 2024

(54) SHAPED DIELECTRIC COMPONENT CROSS-LINKED VIA IRRADIATION AND METHOD OF MAKING THEREOF

(71) Applicant: Rogers Corporation, Chandler, AZ (US)

(72) Inventors: William Blasius, Charlton, MA (US); Stephen O'Connor, Roslindale, MA (US)

(73) Assignee: ROGERS CORPORATION, Chandler, AZ (US)

( * ) Notice: Subject to any disclaimer, the term of this patent is extended or adjusted under 35 U.S.C. 154(b) by 889 days.

(21) Appl. No.: 16/953,481

(22) Filed: Nov. 20, 2020

(65) Prior Publication Data

US 2021/0155782 A1  May 27, 2021

Related U.S. Application Data

(60) Provisional application No. 62/938,983, filed on Nov. 22, 2019.

(51) Int. Cl.
| | | |
|---|---|---|
| *C08L 23/06* | (2006.01) | |
| *C08K 3/22* | (2006.01) | |
| *C08K 3/36* | (2006.01) | |
| *H01Q 15/08* | (2006.01) | |

(52) U.S. Cl.
CPC ............... *C08L 23/06* (2013.01); *C08K 3/22* (2013.01); *C08K 3/36* (2013.01); *H01Q 15/08* (2013.01); *C08K 2003/2241* (2013.01); *C08K 2201/002* (2013.01); *C08L 2207/066* (2013.01); *C08L 2312/06* (2013.01)

(58) Field of Classification Search
CPC .. C08L 23/06; C08L 2207/06; C08L 2312/06; C08K 3/22; C08K 3/36; C08K 2003/2241; C08K 2201/002; H01Q 15/08
See application file for complete search history.

(56) References Cited

U.S. PATENT DOCUMENTS

| | | | |
|---|---|---|---|
| 3,290,412 | A | 12/1966 | Goldblum et al. |
| 4,576,993 | A | 3/1986 | Tamplin et al. |
| 6,326,678 | B1 | 12/2001 | Karnezos et al. |
| 6,652,922 | B1 | 11/2003 | Forester et al. |
| 7,678,853 | B2 | 3/2010 | Oohira |
| 8,446,707 | B1 | 5/2013 | Das et al. |
| 2019/0177527 | A1 | 6/2019 | Huang |
| 2019/0291364 | A1* | 9/2019 | O'Connor ............... B29C 70/58 |
| 2020/0369855 | A1 | 11/2020 | Koes et al. |

FOREIGN PATENT DOCUMENTS

| | | |
|---|---|---|
| CN | 109536140 A | 3/2019 |
| CN | 113840726 A | 12/2021 |
| EP | 2181148 B1 | 2/2017 |
| GB | 2204588 A | 11/1988 |
| TW | 201927884 A | 7/2019 |
| TW | 201940573 A | 10/2019 |
| WO | 9742639 A1 | 11/1997 |
| WO | 0172095 A2 | 9/2001 |
| WO | 2010141432 A1 | 12/2010 |
| WO | 2019183192 A1 | 9/2019 |

OTHER PUBLICATIONS

E-Beam Publication; Electron Beam Crosslinking of Polymers; E-Beam Services, Inc.; www.ebeamservices.com; 2 pages; printed (2019).
E-Beam Publication; "Polymer Crosslinking: Plastic Parts Crosslinking"; E-Beam Services; https://ebeamservices.com/polymeer-crosslinking/services/plastic-parts/; 2 pages; (printed Aug. 27, 2019).
Manas et al.; "The Effect of Irradiation on Mechanical and Thermal Properties of Selected Types of Polymers"; Polymers; 10; 158; 22 pages; (2018).
Preperm data sheet; "Dielectric Materials with Ultra-low Losses Even at mmWaves"; https://www.preperm.com/?gelid-CjwKCAjw-ITqBRB7EiwAZ1c5Uxi208-C01tzyLRZjst . . . ; 11 pages; (printed Aug. 27, 2019).
Uninko Information Sheet; "Uninko Modified PPO/PPE Compounds"; https://www.uninko-plastics.com/cp/ppo-compounds.html;printed Aug. 27, 2019; 3 pages.
International Preliminary Report on Patentability; PCT Application No. PCT/US2020/06100; International Filing Date Nov. 18, 2020; Issued May 17, 2022; 6 pages.
Office Action issued Nov. 20, 2023 by the China National IP Administration for corresponding Chinese application No. 202080080246.8 in the name of Rogers Corporation. English translation provided. 21 pages.
Search Report issued with Office Action Feb. 15, 2024 by the Taiwan IP Office in corresponding Taiwan Patent Application No. 109140751 filed Nov. 20, 2020, 2 pages.
International Search Report; International Application No. PCT/US2020/061000; International Filing Date: Nov. 18, 2020; Date of Mailing: Mar. 16, 2021; 5 pages.
Written Opinion; International Application No. PCT/US2020/061000; International Filing Date: Nov. 18, 2020; Date of Mailing: Mar. 16, 2021; 5 pages.
Second Office Action issued by the China National IP Administration on May 7, 2024 for Chinese Patent Application No. 202080080246.8, English translation, 12 pages.

\* cited by examiner

*Primary Examiner* — Edward J Cain
(74) *Attorney, Agent, or Firm* — CANTOR COLBURN LLP

(57) ABSTRACT

A cured, shaped dielectric component, including a cross-linked product of a composite comprising a thermoplastic polymer, an optional crosslinking co-agent, an optional cure initiator, an optional additive composition, and a ceramic filler composition; wherein the cured, shaped dielectric component has a permittivity of 1.1 to 20 at 10 GHz; and wherein the cured, shaped dielectric component has no melt flow index when tested at 190° C., 2.16 kg, in accordance with ASTM D1238-20.

20 Claims, No Drawings

SHAPED DIELECTRIC COMPONENT CROSS-LINKED VIA IRRADIATION AND METHOD OF MAKING THEREOF

CROSS-REFERENCE TO RELATED APPLICATION

This application claims the benefit of U.S. Provisional Patent Application Ser. No. 62/938,983 filed Nov. 22, 2019. The related application is incorporated herein in its entirety by reference.

BACKGROUND

Many high frequency applications require low dielectric loss polymeric components. Dielectrics in components for such applications benefit from thermoplastic materials that offer ease and speed of processing, but in order to have sufficient heat stability to pass a solder reflow test, the materials need to have softening temperatures above 300 degrees Celsius (° C.). Such materials can be especially relevant to antennas, a critical component in any transmission system or wireless communication infrastructure, for example, in cellular base station antennas or in digital applications requiring high data transfer rates.

Both thermoplastic and thermoset materials have been described for use in dielectric components. Typically, thermoplastic materials with sufficient solder reflow thermal resistance (e.g., temperatures of 240 to 280° C.) for use in forming dielectric components suffer from high viscosities, and require extreme processing temperatures, often requiring special barrel, screw, and heater materials. While thermoset materials can withstand higher processing temperatures after they are crosslinked, they do not lend themselves to high volume plastic processing methods such as extrusion, injection molding, blow molding, thermoforming, and rotational molding.

In view of the above, there remains a need for improved composites for use as shaped dielectric components. Specifically, there is a need for materials that are easily formed into shaped dielectric components at commodity plastics conditions that can withstand exposures to solder reflow temperatures and have a low dielectric loss.

BRIEF SUMMARY

Disclosed herein is a cured, shaped dielectric component, a method of making, and articles comprising the same.

Disclosed herein is a cured, shaped dielectric component that includes a crosslinked product of a composite comprising a thermoplastic polymer, an optional crosslinking co-agent, an optional cure initiator, an optional additive composition, and a ceramic filler composition; wherein the cured, shaped dielectric component has a permittivity of 1.1 to 20 at 10 GHz; and wherein the cured, shaped dielectric component has no melt flow index when tested at 190° C., 2.16 kg, in accordance with ASTM D1238-20.

A method of making a cured, shaped dielectric component includes compounding a composite comprising a thermoplastic polymer, an optional crosslinking co-agent, an optional cure initiator, an optional additive composition, and a ceramic filler composition; melting the compounded composite to form a melt; shaping the melt to form a shaped article; and exposing the shaped article to radiation to generate sufficient free radicals in the thermoplastic polymer to crosslink at least a portion of the thermoplastic polymer to form the cured, shaped dielectric component.

Further disclosed are articles including the cured, shaped dielectric component.

The above described and other features are exemplified by the following detailed description and claims.

DETAILED DESCRIPTION

Described herein are shaped dielectric components that are crosslinked using radiation, and methods of making the components. It was surprisingly discovered that, after irradiation, the electrical properties of the cured, shaped components produced from a thermoplastic polymer are maintained, and the thermal resistance is increased to that of a thermoset. The cured, shaped components have low dielectric loss and can survive solder reflow. In particular, the cured, shaped components can be readily manufactured by forming a composite that includes a thermoplastic polymer. The composite is shaped, for example molded; then the shaped composite is irradiated to crosslink the thermoplastic polymer. The resulting cured, shaped components are thermally stable and exhibit low dimensional changes.

Accordingly, a cured, shaped dielectric component comprises a crosslinked product of a composite comprising a thermoplastic polymer having a low processing temperature, an optional crosslinking co-agent, an optional cure initiator, an optional additive composition, and a ceramic filler composition. The cured, shaped dielectric component has a permittivity of 1.1 to 20 at 500 megahertz (MHz) to 10 gigahertz (GHz), a thermal resistance of up to 280 degrees Celsius (° C.), or both, and no flow at the low processing temperatures used to form the cured, shaped components.

The cured component is derived by crosslinking (cure) of a thermoplastic polymer. Preferably, the thermoplastic polymer is a solid at room temperature and can undergo multiple cycles of melting and solidification without crosslinking (in the absence of irradiation). Thermoplastic polymers that can be used can be processed, i.e., compounded into pellets and formed into a shape (i.e., by injection molding, profile extrusion, blow molding, rotational molding, extruding, melt casting, or three-dimensional printing) at temperatures of 280° C. or less, or 220° C. or less, and as low as 150° C. For example, the thermoplastic polymer can be processed at a low processing temperature of 150° C. to 280° C., or 160° C. to 280° C., or 160° C. to 220° C., or 170° C. to 200° C., or 170° C. to 190° C. The thermoplastic polymer can be processed at 150° C. to 235° C.

For example, the thermoplastic polymer can have a melting temperature (Tm) or a glass transition temperature (Tg) of 250° C. or less, for example 90° C. to 250° C. Tg can be determined by differential scanning calorimetry (DSC), for example at a ramp rate of 10° C./min from −120° C. to 300° C. under a nitrogen gas blanket. Alternatively, or in addition, the thermoplastic polymer can have a melt flow index (MFI) of at least 5 grams per 10 minutes (g/10 min) measured at 190° C., 2.16 kilogram (kg) in accordance with ASTM D1238-20, preferably at least 10 g/10 min measured at 190° C., 2.16 kg in accordance with ASTM D1238-20.

Exemplary thermoplastic polymers that can be crosslinked by irradiation include thermoplastic polyolefins and their copolymers. Exemplary polyolefins include polyethylene, including low density polyethylene (LDPE) and linear low-density polyethylene (LLDPE), polypropylene (PP), and polymethyl pentene (PMP). Additional low temperature processing thermoplastics include fluoropolymers such as fluorinated ethylene propylene copolymer (EFEP), cyclic olefin polymers such as polynorbornenes and copolymers containing norbornenyl units and an acyclic olefin such as ethylene or propylene, and styrenic block copolymers such as a styrene-ethylene-propylene-styrene block copolymer (SEPS). A combination of thermoplastic polymers can also be used.

The amount of each ingredient in the crosslinkable composite can be adjusted to obtain the desired thermal and electrical properties as described in further detail below. Most broadly, the crosslinkable composite can have up to 100 weight percent (wt %) of the thermoplastic polymer if a self-crosslinking polymer such as polyethylene is used. Generally, however, at least 1 wt % of one or more of a crosslinking co-agent, a cure initiator, a ceramic filler composition, or other optional additive is additionally present. In an aspect, the composite for the shaped component comprises 10 to 99 wt %, or 10 to 95 wt %, or 50 to 99 wt %, or 50 to 95 wt %, or 60 to 90 wt %, or 10 to 50 wt %, or 10 to 30 wt %, or 10 to 25 wt %, or 10 to 20 wt % of the thermoplastic polymer, each based on the total weight of the composite.

When the thermoplastic polymer comprises a polyethylene, for example, LDPE or LLDPE, crosslinking by irradiation does not require a crosslinking co-agent, although the inclusion of a crosslinking co-agent can increase the density of the crosslinks. When no crosslinking co-agent is present in the composite, the crosslinked product (the cured, shaped dielectric component) comprises no residue of a crosslinking co-agent. When the thermoplastic polymer does not crosslink or undergo scission in the absence of a crosslinking co-agent, a crosslinking co-agent is present in the composite to crosslink the thermoplastic polymer upon irradiation. For example, if the thermoplastic polymer comprises a polymer other than polyethylene, for example, polypropylene, then the crosslinking co-agent can be present. When a crosslinking co-agent is present, the crosslinked product typically comprises a residue of the crosslinking co-agent.

Exemplary crosslinking co-agents include triallyl cyanurate, triallyl isocyanurate, triallyl trimellitate, a functional phosphazene, triallyl phosphate, polybutadiene, zinc carboxylic acid salts such as zinc diacrylate and zinc dimethacrylate, vinyl-terminated compounds such as divinyl benzene and vinyl-terminated polyphenylene ether oligomers, m-phenylene dimaleimide, multifunctional (meth)acrylates such as trimethylol propane trimethacrylate, tetramethylene glycol diacrylate, trifunctional acrylic esters, dipentaerythritol penatacrylate, and combinations thereof. Incorporating a crosslinking co-agent such as a functional phosphazene can be beneficial as it can also function as a flame retardant. An example of which is a tri-vinyl functional phosphazene such as SPV-100 that is commercially available from Otsuka. Incorporating a crosslinking co-agent such as triallyl trimellitate can reduce the smoke generation.

In an aspect, the crosslinkable composite for the shaped component comprises 0 to 10 wt %, or 0.25 to 10 wt %, or 0.5 to 8 wt %, or 1 to 3 wt % of the crosslinking co-agent each based on the total weight of the composite.

The crosslinkable composite can further optionally comprise a cure initiator. Suitable cure initiators form initiating species, preferably free radicals, upon absorption of radiation. A photoinitiator system can be used, including a photoinitiator that upon irradiation forms free radicals by hydrogen or electron abstraction from a second compound, usually referred to as a co-initiator, which provides the initiating free radical. Curing (crosslinking) can be realized by more than one type of radiation with different wavelengths. In some cases, it may be preferred to use more than one type of cure initiator together.

Examples of specific cure initiators include quinones, benzophenone and substituted benzophenones, hydroxy alkyl phenyl acetophenones, dialkoxy acetophenones, α-halo-acetophenones, aryl ketones (such as 1-hydroxycyclohexyl phenyl ketone, 2-hydroxy-2-methyl-1-phenyl propan-1-one, 2-benzyl-2-dimethylamino-(4-morpholinophenyl) butan-1-one), thioxanthones (such as isopropylthioxanthone), benzil dimethylketal, bis(2,6-dimethyl benzoyl)-2,4,4-trimethylpentylphosphine oxide, trimethylbenzoyl phosphine oxide derivatives (such as 2,4,6 trimethylbenzoyl diphenylphosphine oxide), methyl thio phenyl morpholine ketones (such as 2-methyl-1-[4-(methylthio) phenyl]-2-morpholinopropan-1-one), morpholino phenyl amino ketones, 2,2-dimethoxy-1,2-diphenylethan-1-one, 5,7-diiodo-3-butoxy-6-fluorone, diphenyliodonium fluoride, triphenylsulfonium hexafluorophosphate, benzoin ethers, peroxides, bi-imidazoles, aminoketones, benzoyl oxime esters, camphorquinones, ketocoumarins, Michler's ketone, poly (1,4-diisopropyl benzene) (CUROX™ CC-P3 from United initiators), and 2,3-Dimethyl-2,3-diphenylbutane, which can be used even when the fillers block out all UV radiation. Suitable cure initiators are commercially available, for example, under the trade name IRGACURE™ (from BASF), LUCERIN™ TPO (from BASF AG), PERKADOX™ (from Nouryon), and ESACURE™ (from LAMBERTI). In an aspect, the cure initiator has an initiation or degradation temperature greater than the processing temperature of the thermoplastic polymer, for example, at least 10° C., at least 20° C., or at least 30° C. greater than the processing temperature of the thermoplastic polymer. For example, if the compounding is performed at 180° C. and the molding is performed at 190° C., it is preferred that the cure initiator does not degrade during these processes. For example, the half-life temperatures of PERKADOX™ 30 are 284° C. at 0.1 hours, 259° C. at 1 hour and 237° C. at 10 hours. The cure initiator can have a half-life of 0.05 to 1 hour at a temperature of 284° C., or a half-life of 0.5 to 5 hours, or 0.5 to 2 hours at a temperature of 259° C., or a half-life of 5 to 15 hours at a temperature of 237° C. Compounding or molding are typically done at 2 to 10 minute dwell times, thus resulting in minimal degradation of the curing agent.

The cure initiator can be present in amounts of 0 to 5 wt %, or 0.01 to 5 wt %, or 0.1 to 3 wt %, or 1 to 2 wt %, each based on the total weight of the composite.

The composites described herein can also include a ceramic filler composition for adjusting the dielectric or other properties of the shaped, cured component. Preferably, a ceramic filler composition is present. The ceramic filler composition can comprise at least one of fumed silica, titanium dioxide, barium titanate, strontium titanate, corundum, wollastonite, $Ba_2Ti_9O_{20}$, hollow ceramic spheres, boron nitride, aluminum nitride, silicon carbide, beryllia, alumina, alumina trihydrate, magnesia, mica, talc, nanoclay, magnesium hydroxide, solid glass spheres, hollow glass spheres, or a combination thereof. The ceramic filler composition can comprise silica, titanium dioxide, or a combination thereof. The titanium dioxide particles can be irregular shaped having a plurality of flat surfaces. The ceramic filler can have a D90 particle size by weight of 0.1 to 10 micrometers, or 0.5 to 5 micrometers. The ceramic filler can have a D90 particle size by weight of less than or equal to 2 micrometers, or 0.1 to 2 micrometers.

In an aspect, the ceramic filler composition has a multimodal particle size distribution, wherein a peak of a first mode of the multimodal particle size distribution is at least seven times that of a peak of a second mode of the multimodal particle size distribution. A multimodal particle size distribution can result in a lower viscosity composite. The multimodal particle size distribution can be, for example, bimodal, trimodal, or quadramodal. In other words, the ceramic filler can comprise a first plurality of particles having a first average particle size and a second plurality of particles having a second average particle size, wherein the first average particle size is greater than or equal to 7 times, or greater than or equal to 10 times, or 7 to 60 times the second average particle size, or 7 to 20 times the second average particle size. As used herein, the term particle size refers to a diameter of a sphere having the same volume as the particle and the average particle size refers to a number average of the particle sizes of the plurality of particles. The peak of the first mode (the first average particle size) can be greater than or equal to 2 micrometers, or 2 to 20 micrometers. The peak of the second mode (the second average particle size) can be greater than or equal to 0.2 micrometers, or less than or equal to 2 micrometers, or 0.2 to 1.5 micrometers.

The first plurality of particles and the second plurality of particles can comprise the same ceramic filler. For example, the first plurality of particles and the second plurality of particles can comprise titanium dioxide. Conversely, the first plurality of particles and the second plurality of particles can comprise different ceramic fillers. For example, the first plurality of particles can comprise silica and the second plurality of particles can comprise titanium dioxide.

The first plurality of particles can have an average particle size of 1 to 10 micrometers, or 2 to 5 micrometers. The second plurality of particles can have an average particle size of 0.01 to 1 micrometer, or 0.1 to 0.5 micrometers. The ceramic filler can comprise a first plurality of particles comprising titanium dioxide having an average particle size of 1 to 10 micrometers and a second plurality of particles having an average particle size of 0.1 to 1 micrometer.

The ceramic filler composition can be present in an amount of 1 to 90 wt %, or 5 to 90 wt %, or 1 to 50 wt %, or 5 to 50 wt %, or 10 to 40 wt %, or 50 to 90 wt %, or 70 to 90 wt %, or 75 to 90 wt %, or 80 to 90 wt %, each based on the total weight of the composite.

In another aspect, the composite comprises greater than 20 volume percent (vol %) of the ceramic filler, based on the total volume of the composite.

In an aspect, the composite comprises greater than 40 vol % of the ceramic filler, based on the total volume of the composite.

The ceramic filler can comprise a treated titanium dioxide. For example, the titanium dioxide can be sintered to increase the amount of a desired phase. Without wishing to be bound by theory, it is believed that the sintering may help the composition to achieve a lower dielectric loss. A first plurality of titanium dioxide particles having an average particle size of 1 to 10 micrometers, or 2 to 5 micrometers can be sintered. A first plurality of titanium dioxide particles having an average particle size of 0.1 to 1 micrometer, or 0.1 to 0.5 micrometers can be sintered.

The ceramic filler can be surface-treated to aid dispersion into the thermoplastic polymer, for example, with a surfactant, a silane, a titanate, a zirconate, an organic polymer, or other inorganic material. For example, the particles can be coated with a surfactant such as oleylamine oleic acid, or the like. The silane can comprise N-β(aminoethyl)-γ-aminopropyltriethoxysilane,N-β(aminoethyl)-γ-aminopropyltrimethoxysilane, γ-aminopropyltriethoxysilane, γ-aminopropyltrimethoxysilane, 3-chloropropyl-methoxysilane, γ-glycidoxypropyltriethoxysilane, γ-glycidoxypropyltrimethoxysilane, γ-mercaptopropyltriethoxysilane, γ-mercaptopropyltrimethoxysilane, γ-methacryloxypropyltriethoxysilane, γ-methacryloxypropyltrimethoxysilane, N-phenyl-γ-aminopropyltriethoxysilane, N-phenyl-γ-aminopropyltrimethoxysilane, phenyl silane, trichloro(phenyl) silane, 3-(triethoxysilyl)propyl succinyl anhydride, tris(t-rimethylsiloxy)phenyl silane, vinylbenzylaminoethylaminopropyltrimethoxysilane, vinyltrichlorosilane, vinyltriethoxysilane, vinyltrimethoxysilane, vinyltris(betamethoxyethoxy)silane, or a combination thereof. The silane can comprise phenyl silane. The silane can comprise a substituted phenyl silane, for example, those described in U.S. Pat. No. 4,756,971. The titanate coating can be formed from isostearyl titanate [Tris(isooctadecanoato-O)(propan-2-olato)titanium], neopentyl(diallyl) oxy, trineodecanonyl titanate, neopentyl(diallyl)oxy, tri(dodecyl)benzene-sulfonyl titanate, neopentyl(diallyl)oxy, tri (dioctyl)phosphato titanate, neopentyl(diallyl)oxy, tri (dioctyl)pyro-phosphato titanate, neopentyl(diallyl)oxy, tri (N-ethylenediamino) ethyl titanate, neopentyl(diallyl)oxy, tri(m-amino)phenyl titanate, and neopentyl(diallyl)oxy, trihydroxy caproyl titanate, or a combination thereof. In an aspect, the titanate coating is isostearyl titanate [Tris(isooctadecanoato-O)(propan-2-olato)titanium] such as TYTAN™ CP-317 (Borica). The zirconate coating can be formed from neopentyl(diallyloxy)tri(dioctyl) pyro-phosphate zirconate, neopentyl(diallyloxy)tri(N-ethylenediamino) ethyl zirconate, or a combination thereof.

The coating can be present at 0.01 to 2 wt %, or 0.1 to 1 wt %, based on the total weight of the coated ceramic filler. The ceramic filler can be coated with $SiO_2$, $Al_2O_3$, MgO, or a combination thereof. The ceramic filler can be coated by a base-catalyzed sol-gel technique, a polyetherimide (PEI) wet and dry coating technique, or a poly(ether ketone) (PEEK) wet and dry coating technique.

In an aspect, the composite includes an additive composition to adjust a desired property of the cured, shaped component. The additive composition can include an antioxidant, a metal deactivator, a process aid (for example polyethylene wax or a stearic acid derivative), an adhesion promoter, or a combination thereof. A non-limiting example of an antioxidant is poly[[6-(1,1,3,3-tetramethylbutyl) amino-s-triazine-2,4-dyil][(2,2,6,6-te-tramethyl-4-piperidyl)imino]hexamethylene[(2,2,6,6-tetramethyl-4-piperidyl-)imino]], commercially available from BASF under the tradename CHIMASSORB™ 944 or IRGANOX™ 1010 (Pentaerythritol tetrakis(3-(3,5-di-tert-butyl-4-hydroxyphenyl)propionate)) also commercially available from BASF. A non-limiting example of a metal deactivator is 2,2-oxalyldiamido bis[ethyl 3-(3,5-di-t-butyl-4-hydroxyphenyl)propionate] commercially available from ADDIVANT™ under the tradename NAUGARD™ XL-1. A preferred metal deactivator is SONGNOX™ 1024 1,2-Bis(3,5-di-tert-butylhydroxyhydrocinnamoyl) hydrazine commercially available from Songwon. Exemplary process aids include Honeywell A-C™ 6A LDPE wax. Exemplary adhesion promoters include maleic anhydride grafted polyolefins such as SCONA™ TSPE 1112 GALL commercially available from BYK Chemie.

Each additive when present can be used amount of 0 to 2 wt %, or 0.0001 to 2 wt %, or 0.0005 to 1.6 wt %, each based on the total weight of the composite. Generally, an additive composition can be present in a total amount 0.0001 to 5 wt %, or 0.001 to 3 wt %, each based on the total weight of the composite.

Accordingly, a method of making a cured, shaped dielectric component, can comprise compounding a composite comprising a thermoplastic polymer having a low processing temperature, an optional crosslinking co-agent, an optional cure initiator, an optional additive composition, and a ceramic filler composition. The compounded composite can be melted to form a melt, and the melt is shaped to form a shaped article. The shaped article can then be exposed to radiation to generate sufficient free radicals in the thermoplastic polymer to crosslink at least a portion of the thermoplastic polymer to form the cured, shaped dielectric component.

In the method of making the cured, shaped dielectric component, the compounding can be done on known apparatuses suitable for melting and blending thermoplastic polymers such as a single or twin screw extruder, Buss co-kneader, Farrel continuous mixer, Banbury mixer, or a two roll mill. The various ingredients can be mixed directly, or fed sequentially. In an aspect, the compound is extruded as strands and cut into cylindrical pellets. Compounding or other processing can be done at temperatures of 150° C. to 250° C., or 160° C. to 220° C., or 170° C. to 200° C., or 170° C. to 190° C.

After compounding, the crosslinkable composite can have an MFI of at least 5 g/10 min measured at 190° C., 2.16 kg in accordance with ASTM D1238-20, preferably, at least 10 g/10 min measured at 190° C., 2.16 kg in accordance with ASTM D1238-20.

The crosslinkable composite can then be melted and shaped. Melting and shaping can be at temperatures of 150° C. to 250° C., or 160° C. to 220° C., or 170° C. to 200° C., or 170° C. to 190° C. Shaping can be accomplished, for example, by molding (e.g., injection molding, rotational molding, or blow molding), extruding (e.g., extruding a profile or a layer), or otherwise forming a layer to form a solid shape, sheet, layer, rod, tube, or hollow article. For example, shaping can include forming a layer on a copper substrate such as a conductive copper layer. In a preferred aspect, shaping is accomplished by molding. In an aspect, a foaming agent can be added during the melting and shaping to provide a low-density shape, sheet, rod, or tube. In an aspect, the melted crosslinkable composite can be injected into a mold or overmolded onto a substrate to provide the shaped article and minimize secondary handling and bonding processes.

The shaped article can be irradiated to generate free radicals on the polymer backbone or side chains, thus initiating crosslinking and forming a three-dimensional network in the cured, shaped component. Exemplary irradiation methods include electron beam radiation, gamma radiation, ultraviolet radiation, and the like.

In another aspect, the compound is melted and shaped on a substrate, and irradiated on the substrate. A mask can be used to cover areas of the substrate to be protected from the irradiation. Thus, in an aspect, the shaped article is formed on a substrate, a mask is used to cover radiation sensitive areas of the substrate to be protected from irradiation, and the unmasked areas of the shaped article are exposed to irradiation providing crosslinking of the shaped article while protecting radiation sensitive areas of the substrate.

The cured, shaped component comprises the cured product of the composite, in particular the crosslinked product of the thermoplastic polymer and any residual crosslinking co-agent, curing agent, and additive(s) if used, and the ceramic filler composition. Of course, no residual crosslinking co-agent, curing agent, or additive will be present if no crosslinking co-agent, curing agent, or additive is present in the composite.

Importantly, after cure, the shaped dielectric component has no melt flow at the processing temperatures described above, e.g., at 150° C. to 250° C., or 160° C. to 220° C., or 170° C. to 200° C., or 170° C. to 190° C. As used herein, the phrase "no melt flow" can mean that the MFI is equal to 0 g/10 min. This feature can be characterized by the shaped dielectric component having no (i.e., an unmeasurable) MFI, when tested at 190° C., 2.16 kg, in accordance with ASTM D1238-20.

The cured, shaped dielectric component can have a dielectric constant (relative permittivity, Dk) of 1.1 to 20 over 500 MHz to 10 GHz. The cured, shaped dielectric component can have a thermal resistance of at least to 250° C. The cured, shaped dielectric component can be dimensionally stable such that a dimension of the cured, shaped dielectric component changes by less than 5%, or 0 to 1% up to temperature as high as 280° C.

In an aspect, the cured, shaped dielectric component can have a dielectric constant of greater than 1.1, such as 1.5 to 20, or 2.5 to 20, or 3 to 18, or 3 to 13, each when measured at 10 GHz. In an aspect, the cured, shaped dielectric component has a dielectric constant of less than 6, measured at 10 GHz. In another aspect, the cured, shaped dielectric component can have a dielectric constant of greater than 1.1, such as 1.6 to 6, or 1.5 to 6, or 2 to 6 each when measured at 10 GHz. In still another aspect, the cured, shaped dielectric component can have a dielectric constant of greater than 6, or greater than 10, or greater than 12, for example 6 to 20, or 6 to 18, or 6 to 15; or 10 to 20 or 12 to 20, each when measured at 10 GHz.

The cured, shaped dielectric component can have a dielectric loss (Df) of less than or equal to 0.007, or less than or equal to 0.005. The dielectric loss can be as low as 0.001, when measured at 10 GHz. For example, the cured, shaped dielectric component can have a dielectric loss of or 0.001 to 0.005 at 10 GHz.

The dielectric properties can be measured in accordance with "Stripline Test for Permittivity and Loss Tangent at X-Band" test method IPC-TM-650 2.5.5.5 at a temperature of 23 to 25° C.

The cured, shaped dielectric component can pass solder float testing at 288° C. for 30 seconds without cracking, blistering, or warping of the component.

The linear dimensional change in the component before curing compared to after curing can be less than 2%, preferably less than 1%, in at least one, two, three, or all linear dimensions, such as diameter, length, height, width, and the like. In an aspect, the linear dimensional change in the component before curing compared to after curing can be less than 2%, preferably less than 1%, in two or three linear dimensions.

In another aspect, the volumetric dimensional change in the component before curing compared to after curing can be less than 2%, preferably less than 1%. Volumetric change can be measured, for example, by three-dimensional imaging.

Advantageously, the use of a thermoplastic polymer allows for the production of cured, shaped dielectric components using standard equipment. In addition, with the use of irradiation to crosslink the shaped dielectric components, the cured components can function at temperatures far above the temperature of the thermoplastic. The cured, shaped dielectric components have the thermal resistance to be unaffected by solder reflow processing at 240° C. to 280° C.

A circuit material comprising the cured, shaped dielectric component described herein can be prepared by forming a multilayer material having a substrate layer comprising the cured, shaped dielectric component with a conductive layer disposed thereon. Useful conductive layers include, for example, stainless steel, copper, gold, silver, aluminum, zinc, tin, lead, transition metals, and alloys thereof. There are no particular limitations regarding the thickness of the conductive layer, nor are there any limitations as to the shape, size, or texture of the surface of the conductive layer. The conductive layer can have a thickness of 3 to 200 micrometers, or 9 to 180 micrometers. When two or more conductive layers are present, the thickness of the two layers can be the same or different. The conductive layer can comprise a copper layer. Suitable conductive layers include a thin layer of a conductive metal, for example, a copper foil presently used in the formation of circuits, for example, electrodeposited copper foils. The copper foil can have a root mean squared (RMS) roughness of less than or equal to 2 micrometers, or less than or equal to 0.7 micrometers, where roughness is measured using a Veeco Instruments WYCO™ Optical Profiler, using the method of white light interferometry.

The conductive layer can be applied by laminating the conductive layer onto the substrate, by direct laser structuring, or by adhering the conductive layer to the substrate via an adhesive layer. Other methods known in the art can be used to apply the conductive layer where permitted by the particular materials and form of the circuit material, for example, electrodeposition, and chemical vapor deposition.

The laminating can entail laminating a multilayer stack comprising the substrate, a conductive layer, and an optional intermediate layer between the substrate and the conductive layer to form a layered structure. The conductive layer can be in direct contact with the substrate layer, without the intermediate layer. The layered structure can then be placed in a press, for example, a vacuum press, under a pressure and temperature and for duration of time suitable to bond the layers and form a laminate. Lamination and optional curing can be by a one-step process, for example, using a vacuum press, or can be by a multi-step process. In a one-step process, the layered structure can be placed in a press, brought up to laminating pressure (for example, 150 to 400 pounds per square inch (psi) (1 to 2.8 megapascals) and heated to laminating temperature (for example, 260 to 390° C.). The laminating temperature and pressure can be maintained for a desired soak time, for example, 20 minutes, and thereafter cooled (while still under pressure) to less than or equal to 150° C.

If present, the intermediate layer can comprise a polyfluorocarbon film that can be located in between the conductive layer and the substrate layer, and an optional layer of microglass reinforced fluorocarbon polymer can be located in between the polyfluorocarbon film and the conductive layer. The layer of microglass reinforced fluorocarbon polymer can increase the adhesion of the conductive layer to the substrate. The microglass can be present in an amount of 4 to 30 weight percent (wt %) based on the total weight of the layer. The microglass can have a longest length scale of less than or equal to 900 micrometers, or less than or equal to 500 micrometers. The microglass can be microglass of the type as commercially available by Johns-Manville Corporation of Denver, Colorado. The polyfluorocarbon film comprises a fluoropolymer (for example, polytetrafluoroethylene (PTFE), a fluorinated ethylene-propylene copolymer (for example, TEFLON™ FEP), and a copolymer having a tetrafluoroethylene backbone with a fully fluorinated alkoxy side chain (for example, TEFLON™ PFA).

The conductive layer can be applied by laser direct structuring. Here, the substrate can comprise a laser direct structuring additive, and the laser direct structuring can comprise using a laser to irradiate the surface of the substrate, forming a track of the laser direct structuring additive, and applying a conductive metal to the track. The laser direct structuring additive can comprise a metal oxide particle (for example, titanium oxide and copper chromium oxide). The laser direct structuring additive can comprise a spinel-based inorganic metal oxide particle, for example, spinel copper. The metal oxide particle can be coated, for example, with a composition comprising tin and antimony (for example, 50 to 99 wt % of tin and 1 to 50 wt % of antimony, based on the total weight of the coating). The laser direct structuring additive can comprise 2 to 20 parts of the additive based on 100 parts of the respective composition. The irradiating can be performed with a YAG laser having a wavelength of 1,064 nanometers (nm) under an output power of 10 Watts (W), a frequency of 80 kilohertz (kHz), and a rate of 3 meters per second (m/s). The conductive metal can be applied using a plating process in an electroless plating bath comprising, for example, copper.

The conductive layer can be applied by adhesively applying the conductive layer. The conductive layer can be a circuit (the metallized layer of another circuit), for example, a flex circuit. An adhesion layer can be disposed between one or more conductive layers and the substrate. When appropriate, the adhesion layer can comprise a poly(arylene ether), and a carboxy-functionalized polybutadiene or polyisoprene polymer comprising butadiene, isoprene, or butadiene and isoprene units, and 0 to 50 wt % of co-curable monomer units. The adhesive layer can be present in an amount of 2 to 15 grams per square meter. The poly(arylene ether) can comprise a carboxy-functionalized poly(arylene ether). The poly(arylene ether) can be the reaction product of a poly(arylene ether) and a cyclic anhydride or the reaction product of a poly(arylene ether) and maleic anhydride. The carboxy-functionalized polybutadiene or polyisoprene polymer can be a carboxy-functionalized butadiene-styrene copolymer. The carboxy-functionalized polybutadiene or polyisoprene polymer can be the reaction product of a polybutadiene or polyisoprene polymer and a cyclic anhydride. The carboxy-functionalized polybutadiene or polyisoprene polymer can be a maleinized polybutadiene-styrene or a maleinized polyisoprene-styrene copolymer.

The cured, shaped dielectric component can be used in electronic devices and electromagnetic components, for example, inductors on electronic integrated circuit chips, electronic circuits, electronic packages, modules, housings, transducers, ultra-high frequency (UHF) antennas, very high frequency (VHF) antennas, and microwave antennas for a wide variety of applications, for example, electric power applications, data storage, and microwave communication. The cured, shaped dielectric component can be used in electronic devices, for example, mobile internet devices. The cured, shaped dielectric component can be used in electronic devices, for example, cell phones, tablets, laptops, and internet watches. The cured, shaped dielectric component can be used in applications where an external direct current magnetic field is applied. Additionally, the cured, shaped dielectric component can be used with very good results (size and bandwidth) in all antenna designs over the frequency range of 1 to 10 GHz. The antenna can be a planar inverted-F antenna, a patch antenna, a dipole antenna, or a meander line antenna. In an aspect, the cured, shaped dielectric component is the dielectric portion of a dielectric resonator antenna. The cured, shaped dielectric component can be a resonator. The cured, shaped dielectric component can be a dielectric resonator antenna. The cured, shaped dielectric component can be an electromagnetic waveguide, including but not limited to a dielectric waveguide or a metal waveguide with dielectric in the transmission region. The cured, shaped dielectric component can be a dielectric electromagnetic lens, such as a dielectric electromagnetic lens configured to operate at a frequency greater than 5 GHz and less than 300 GHz. The cured, shaped dielectric component can be used in a radio-frequency (RF) component. The cured, shaped dielectric component can be used in a microwave component. The cured, shaped dielectric component can be used in an mm-wave component. The cured, shaped dielectric component can be used in a terahertz component. The cured, shaped dielectric component can be used in an optical component.

The cured, shaped dielectric component (also referred to as the component) can comprise a crosslinked product of a composite. The composite can comprise a thermoplastic polymer and a ceramic filler composition. The composite can optionally comprise at least one of a crosslinking co-agent, a cure initiator, or an additive composition. The component can have a permittivity of 1.1 to 20 at 10 GHz. The component can have no melt flow index when tested at 190° C., 2.16 kg, in accordance with ASTM D1238-20. The thermoplastic polymer can have a processing temperature of 160° C. to 280° C. The thermoplastic polymer can have a melt temperature of 250° C. or less, or 90° C. to 250° C. The thermoplastic polymer can have a melt flow index of less than 5 grams per 10 minutes measured at 190° C., 2.16 kg, in accordance with ASTM D1238-20. The thermoplastic polymer can comprise a polyethylene, a polypropylene, a polymethylpentene, a fluorinated ethylene propylene copolymer, a polynorbornene, a styrene-ethylene-propylene-styrene block copolymer, or a combination thereof. The thermoplastic polymer can comprise a low-density polyethylene or a linear low-density polyethylene. The crosslinked product can comprise a residue of a crosslinking co-agent. Conversely, the crosslinked product can be free of a residue of a crosslinking co-agent, for example, if the thermoplastic polymer comprises a thermoplastic polymer that self-crosslinks upon irradiation such as polyethylene. The composite can comprise the cure initiator and it can have an initiation temperature greater than the processing temperature of the thermoplastic polymer, preferably at least 10° C., at least 20° C., or at least 30° C. greater than the processing temperature of the thermoplastic polymer. The composite can comprise all three of the crosslinking co-agent, the cure initiator, and the additive composition. The crosslinking co-agent can be present and can comprise triallyl cyanurate, triallyl isocyanurate, triallyl phosphate, polybutadiene, zinc diacrylate, zinc dimethacrylate, divinyl benzene, vinyl terminated polyphenylene ether oligomers, m-phenylene dimaleimide, trimethylol propane trimethacrylate, tetramethylene glycol diacrylate, trifunctional acrylic ester, dipentaerythritol pentaacrylate, or a combination thereof. The additive composition can be present and can comprise an antioxidant, a metal deactivator, a process aide, an adhesion promoter, or a combination thereof. The ceramic filler can comprise fumed silica, titanium dioxide, barium titanate, strontium titanate, corundum, wollastonite, $Ba_2Ti_9O_{20}$, hollow ceramic spheres, boron nitride, aluminum nitride, silicon carbide, beryllia, alumina, alumina trihydrate, magnesia, mica, talc, nanoclay, magnesium hydroxide, solid glass spheres, hollow glass spheres, or a combination thereof. The ceramic filler can have a multimodal particle size distribution, wherein a peak of a first mode of the multimodal particle size distribution is at least seven times that of a peak of a second mode of the multimodal particle size distribution.

The composite before crosslinking can comprise 10 to 99 wt % of the thermoplastic polymer, 0 to 10 wt %, or 0.25 to 10 wt % of the crosslinking co-agent, 0 to 5 wt %, or 0.01 to 5 wt % the cure initiator, 0 to 2 wt %, or 0.0001 to 2 wt % of the additive composition, and 1 to 90 wt % of the ceramic filler composition, each based on the total weight of the composite before crosslinking, and wherein the total is 100 wt %. The composite before crosslinking can comprise 50 to 95 wt % of the thermoplastic polymer, 0 to 10 wt %, or 0.25 to 10 wt % of the crosslinking co-agent, 0 to 5 wt %, or 0.01 to 5 wt % the cure initiator, 0 to 2 wt %, or 0.001 to 2 wt % of the additive composition, and 5 to 50 wt % of the ceramic filler composition, each based on the total weight of the composite before crosslinking, and wherein the total is 100 wt %. The composite before crosslinking can comprise 10 to 50 wt % of the thermoplastic polymer, 0 to 10 wt %, or 0.25 to 10 wt % of the crosslinking co-agent, 0 to 5 wt %, or 0.01 to 5 wt % the cure initiator, 0 to 2 wt %, or 0.001 to 2 wt % of the additive composition, and 50 to 90 wt % of the ceramic filler composition, each based on the total weight of the composite before crosslinking, and wherein the total is 100 wt %. The composite before crosslinking can comprise 10 to 25 wt % of the thermoplastic polymer, 0 to 10 wt %, or 0.25 to 10 wt % of the crosslinking co-agent, 0 to 5 wt %, or 0.01 to 5 wt % the cure initiator, 0 to 2 wt %, or 0.001 to 2 wt % of the additive composition, and 75 to 90 wt % of the ceramic filler composition, each based on the total weight of the composite before crosslinking, and wherein the total is 100 wt %. The composite can comprise greater than 20 volume percent, preferably greater than 40 volume percent of the ceramic filler, based on the total volume of the composite.

The component can have permittivity is 1.1 to 20, measured at 10 GHz. If the component comprises a reduced amount of the ceramic filler composition, for example, 5 to 50 wt % based on the total weight of the composite before crosslinking, the component can have lower permittivity of 1.1 to 6, measured at 10 GHz. If the component comprises an increased amount of the ceramic filler composition, for example, greater than or equal to 50 to 90 wt % based on the total weight of the composite before crosslinking, the component can have lower permittivity of greater than 6, preferably greater than 10, preferably greater than 12, measured at 10 GHz. A linear dimensional change in the component before curing compared to after curing is less than 2%, preferably less than 1% in any or all linear dimensions.

The component can be a dielectric resonator antenna, a dielectric portion of a dielectric resonator antenna, an electromagnetic waveguide, a dielectric electromagnetic lens, a radio-frequency component, a microwave component, an mm-wave component, a terahertz component, or an optical component. The component can be a dielectric electromagnetic lens, preferably a dielectric electromagnetic lens configured to operate at a frequency greater than 5 GHz and less than 300 GHz. A circuit material or circuit substrate can comprise the cured, shaped dielectric component.

A method of making the cured, shaped dielectric component can comprise compounding a composite comprising the thermoplastic polymer, the optional crosslinking co-agent, the optional cure initiator, the optional additive composition, and the ceramic filler composition; melting the compounded composite to form a melt; shaping the melt to form a shaped article; and exposing the shaped article to radiation to generate sufficient free radicals in the thermoplastic polymer and crosslink at least a portion of the thermoplastic polymer to form the cured, shaped dielectric component. The method can further comprise forming the shaped article onto a substrate, masking at least a portion of the shaped article to the irradiation, and exposing the unmasked portion of the shaped article to the irradiation to form the cured, shaped dielectric component. The shaping can comprise molding, or forming a layer, preferably molding.

The following examples are merely illustrative and are not intended to limit the compositions, cured, shaped components, or devices made in set forth herein, or the steps, conditions, or process parameters set forth herein.

EXAMPLES

In the Examples, the melt flow index (MFI) at 190° C./2.16 kg was measured by Tinius Olsen™ Extrusion Plastometer.

Thermomechanical analysis (TMA) melting point was measured by a TA Instruments TMA Q400. TMA was determined in accordance with is ASTM E1545-11(2016) where the samples were heated from −50° C. to 300° C., cooled, and reheated from −50° C. to 300° C. all at a rate of 10° C. per minute. The first heat cycle is to anneal out orientation and extraneous physical effects and the second heating was performed to prove that the measurement was reproducible.

Long strip line permittivity (LSL) was measured using a Hewlett Packard Network Analyzer 8510 and is reported at 10 GHz.

Solder float at 287° C. was determined by a Ritehete solder melt unit.

The components used in the Examples are provided in Table 1.

TABLE 1

| Component | Description | Supplier |
| --- | --- | --- |
| LLDPE | Linear low-density polyethylene (LLDPE, 5252) | ExxonMobil |
| PP | Poly(propylene-ethylene) copolymer (Pinnacle 2180) | Pinnacle Polymers |
| PP Wax | Polypropylene wax (A-C ™ 1089) (hardness < 0.5, Mettler drop point = 146° C., viscosity = 45 at 190° C. | Honeywell |
| Titania-2 | $TiO_2$ (Ti-Pure ™ R-104) | Chemours |
| TAIC-1 | Triallyl isocyanurate (TAIC DLC ™-A) | Natrochem |
| TAIC-2 | Triallyl isocyanurate (TAICROS ™) | Evonik |
| Cure initiator | 2,3-Dimethyl-2,3-diphenylbutane (PERKADOX ™ 30) | Nouryon |
| Stabilizers | SONGNOX ™ 1010 & 1024 | Songwon |

Example 1-6

The compositions of Table 2 were compounded by twin screw extrusion. The compounded compositions were formed into a shape by injection molding at 180° C. using an Extrude to Fill E30V molding machine. The formed shape was then crosslinked using an electron beam at room temperature (0, 8, 16 and 32 MRads). The MFI and TMA of the pre-crosslinked material (0 MRad) and the properties of the crosslinked shapes were determined and are shown in Table 2.

TABLE 2

| Components | Ex. 1 | Ex. 2 | Ex. 3 | Ex. 4 | Ex. 5 | Ex. 6 |
| --- | --- | --- | --- | --- | --- | --- |
| LLDPE | 99 | 97 | 95 | 23.76 | 23.28 | 22.8 |
| Titania* | — | — | — | 76 | 76 | 76 |
| TAIC-1 | 1 | 3 | 5 | 0.24 | 0.72 | 1.2 |
| Properties | | | | | | |
| MFI (g/10 min) | 55.6 | 64.7 | 52.8 | 17.5 | 16.2 | 16.3 |
| TMA melt point | | | | | | |
| 0 MRad | — | — | 122° C. | — | — | 145° C. |
| 8 MRad | 132° C. | No melt | No melt | No melt | No melt | No melt |
| 16 MRad | No melt | No melt | No melt | No melt | No melt | No melt |
| 32 MRad | No melt | No melt | No melt | No melt | No melt | No melt |
| LSL Dk/Df | | | | | | |
| 0 MRad | — | — | 2.41/0.0024 | — | — | 10.51/0.0036 |
| 8 MRad | — | — | 2.42/0.0027 | — | — | 10.52/0.0027 |
| 16 MRad | — | — | 2.42/0.0026 | — | — | 10.50/0.0033 |
| 32 MRad | — | — | 2.42/0.003 | — | — | 10.54/0.0035 |
| Solder float at 287° C. | | | | | | |
| 32 MRad | — | — | — | — | Pass at 5 minutes | — |

*Mix of titanate-treated Rogers $TiO_2$ and Chemours R-104

Example 7

Under the same conditions of measurement, a liquid crystal polymer (LCP) filled with $TiO_2$ failed the solder float test at 5 minutes with cracks.

Examples 8-19

Examples 8-10 as shown in Table 3 were prepared with (8) no crosslinking co-agent and no cure initiator, (9) a crosslinking co-agent, but no cure initiator, and (10) both a crosslinking co-agent and cure initiator and cured by exposure to 32 MRads of electron beam radiation. Melt Peak temperature and melt effect of the cured compositions are also shown in Table 3.

TABLE 3

| Component | Ex. 8 | Ex. 9 | Ex. 10 |
|---|---|---|---|
| Polypropylene Copolymer | 13.019 | 12.759 | 12.733 |
| Polypropylene wax | 2.04 | 2.001 | 1.99 |
| Stabilizers | 0.082 | 0.08 | 0.079 |
| Titanium dioxide* | 84.85 | 83.158 | 82.99 |
| TAIC-2 | 0 | 2 | 1.99 |
| Cure initiator | 0 | 0 | 0.199 |
| TMA Melt Peak Temp | 155° C. | 155° C. | None |
| TMA Melt Effect | Complete melt | Very Minor | No melt |

*Mix of titanate-treated Rogers TiO$_2$ and Chemours R-104

The data in Table 3 show that the polypropylene of Ex. 8 is depolymerized by scission when exposed to an electron beam without a crosslinking agent or initiator, as demonstrated by complete melting. Adding a crosslinking coagent as in Ex. 9 resulted in a significant improvement, but the TMA scan still showed a small feature at the melt point, demonstrating the presence of some uncrosslinked domains, although minor. Adding both a crosslinking agent and a secondary cure initiator (284° C. temperature for 0.1 hour half-life) well below the melt mixing temperature of 180° C.) as in Ex. 10 eliminated the last remnants of uncrosslinked polymer, as evidenced by the TMA scan showing no melt features.

Example 20: Dimensional Change

Shaped components, specifically antennas, containing the following composition were formed: 6.93 wt % LLDPE, 6.93 wt % HDPE, 78.95 wt % titanium dioxide, 4.95 wt % fumed silica/silane 2.02% TAIC, 0.198 wt % PERDADOX™ 30 cure initiator, and 0.0396 wt % each of metal deactivator and antioxidant. The diameter and height of the component in millimeters (mm) were measured prior to and after curing at room temperature. The results are provided in the Table 4 where samples A to E are identical samples labeled for tracking purposes.

TABLE 4

| Sample | Dimension | Pre-irradiation, mm | Post-irradiation, mm |
|---|---|---|---|
| A | Diameter | 1.09 | 1.08 |
|   | Height | 0.76 | 0.77 |
| B | Diameter | 1.09 | 1.08 |
|   | Height | 0.76 | 0.76 |
| C | Diameter | 1.08 | 1.08 |
|   | Height | 0.77 | 0.77 |
| D | Diameter | 1.08 | 1.08 |
|   | Height | 0.76 | 0.77 |
| E | Diameter | 1.09 | 1.09 |
|   | Height | 0.76 | 0.76 |

As can be seen in Table 4, the diameter and height of the component were essentially unchanged after irradiation compared to prior to irradiation.

Set forth below are non-limiting aspects of the present disclosure.

Aspect 1: A cured, shaped dielectric component includes a crosslinked product of a composite comprising a thermoplastic polymer, an optional crosslinking co-agent, an optional cure initiator, an optional additive composition, and a ceramic filler composition; wherein the cured, shaped dielectric component has a permittivity of 1.1 to 20 at 10 GHz; and wherein the cured, shaped dielectric component has no melt flow index when tested at 190° C., 2.16 kg, in accordance with ASTM D1238-20.

Aspect 2. The cured, shaped dielectric component of aspect 1, wherein the thermoplastic polymer has a processing temperature of 160° C. to 280° C.

Aspect 3. The cured, shaped dielectric component of any one of aspects 1 or 2, wherein the thermoplastic polymer has a melt temperature of 250° C. or less, or 90° C. to 250° C.

Aspect 4. The cured, shaped dielectric component of any one of aspects 1 to 3, wherein the thermoplastic polymer has a melt flow index of less than 5 grams per 10 minutes measured at 190° C., 2.16 kg, in accordance with ASTM D1238-20.

Aspect 5. The cured, shaped dielectric component of any one of aspects 1 to 4, wherein the thermoplastic polymer comprises a polyethylene, a polypropylene, a polymethylpentene, a fluorinated ethylene propylene copolymer, a polynorbornene, a styrene-ethylene-propylene-styrene block copolymer, or a combination thereof.

Aspect 6. The cured, shaped dielectric component of any one of aspects 1 to 5, wherein the thermoplastic polymer comprises a low-density polyethylene or a linear low-density polyethylene.

Aspect 7. The cured, shaped dielectric component of any one of aspects 1 to 6, wherein the crosslinked product comprises a residue of a crosslinking co-agent.

Aspect 8. The cured, shaped dielectric component of any one of aspects 1 to 6, wherein the crosslinked product comprises no residue of a crosslinking co-agent; and wherein the thermoplastic polymer comprises a thermoplastic polymer that self-crosslinks upon irradiation such as polyethylene.

Aspect 9: The cured, shaped dielectric component of any one of aspects 1 to 8, wherein the cure initiator is present and has an initiation temperature greater than the processing temperature of the thermoplastic polymer, preferably, at least 10° C., at least 20° C., or at least 30° C. greater than the processing temperature of the thermoplastic polymer.

Aspect 10. The cured, shaped dielectric component of any one of aspects 1 to 9, wherein at least one or more of the crosslinking co-agents, the cure initiator, or the additive composition is present, preferably wherein all three of the crosslinking co-agent, the cure initiator, and the additive composition are present.

Aspect 11. The cured, shaped dielectric component of any one of aspects 1 to 10, wherein the crosslinking co-agent comprises triallyl cyanurate, triallyl isocyanurate, triallyl phosphate, polybutadiene, zinc diacrylate, zinc dimethacrylate, divinyl benzene, vinyl terminated polyphenylene ether oligomers, m-phenylene dimaleimide, trimethylol propane trimethacrylate, tetramethylene glycol diacrylate, trifunctional acrylic ester, dipentaerythritol pentaacrylate, or a combination thereof.

Aspect 12. The cured, shaped dielectric component of any one of aspects 1 to 11, wherein the additive composition comprises an antioxidant, a metal deactivator, a process aide, an adhesion promoter, or a combination thereof.

Aspect 13. The cured, shaped dielectric component of any one of aspects 1 to 12, wherein the ceramic filler comprises fumed silica, titanium dioxide, barium titanate, strontium titanate, corundum, wollastonite, $Ba_2Ti_9O_{20}$, hollow ceramic spheres, boron nitride, aluminum nitride, silicon carbide, beryllia, alumina, alumina trihydrate, magnesia, mica, talc, nanoclay, magnesium hydroxide, solid glass spheres, hollow glass spheres, or a combination thereof.

Aspect 14. The cured, shaped dielectric component of any one of aspects 1 to 13, wherein the ceramic filler has a multimodal particle size distribution, wherein a peak of a first mode of the multimodal particle size distribution is at least seven times that of a peak of a second mode of the multimodal particle size distribution.

Aspect 15. The cured, shaped dielectric component of any one of aspects 1 to 14, wherein the composite before crosslinking comprises 10 to 99 wt % of the thermoplastic polymer 0 to 10 wt %, or 0.25 to 10 wt % of the crosslinking co-agent, 0 to 5 wt %, or 0.01 to 5 wt % the cure initiator, 0 to 2 wt %, or 0.0001 to 2 wt % of the additive composition, and 1 to 90 wt % of the ceramic filler composition, each based on the total weight of the composite before crosslinking, and wherein the total is 100 wt %.

Aspect 16. The cured, shaped dielectric component of aspect 15, wherein the composite before crosslinking comprises 50 to 95 wt % of the thermoplastic polymer, 0 to 10 wt %, or 0.25 to 10 wt % of the crosslinking co-agent, 0 to 5 wt %, or 0.01 to 5 wt % the cure initiator, 0 to 2 wt %, or 0.0001 to 2 wt % of the additive composition, and 5 to 50 wt % of the ceramic filler composition, each based on the total weight of the composite before crosslinking, and wherein the total is 100 wt %.

Aspect 17. The cured, shaped dielectric component of any one of aspects 1 to 16, having a permittivity of less than or equal to 6, less than 6, or 1.1 to 6 measured at 10 GHz.

Aspect 18. The cured, shaped dielectric component of any one of aspects 1 to 14, wherein the composite before crosslinking comprises 10 to 50 wt % of the thermoplastic polymer, 0 to 10 wt %, or 0.25 to 10 wt % of the crosslinking co-agent, 0 to 5 wt %, or 0.01 to 5 wt % the cure initiator, 0 to 2 wt %, or 0.0001 to 2 wt % of the additive composition, and 50 to 90 wt % of the ceramic filler composition, each based on the total weight of the composite before crosslinking, and wherein the total is 100 wt %.

Aspect 19. The cured, shaped dielectric component of aspect 18, wherein the composite before crosslinking comprises 10 to 25 wt % of the thermoplastic polymer, 0 to 10 wt %, or 0.25 to 10 wt % of the crosslinking co-agent, 0 to 5 wt %, or 0.01 to 5 wt % the cure initiator, 0 to 2 wt %, or 0.0001 to 2 wt % of the additive composition, and 75 to 90 wt % of the ceramic filler composition, each based on the total weight of the composite before crosslinking, and wherein the total is 100 wt %.

Aspect 20. The cured, shaped dielectric component of any one of aspects 1 to 19 or 1 to 14 or 16 to 17, wherein the composite comprises greater than 20 volume %, preferably greater than 40 volume % of the ceramic filler, based on the total volume of the composite.

Aspect 21. The cured, shaped dielectric component of any one of aspects 1 to 20 or 1 to 14 or 18 to 20, having a dielectric constant of greater than or equal to 6, preferably greater than or equal to 10, preferably greater than or equal to 12, measured at 10 GHz.

Aspect 22: The cured, shaped dielectric component of any one of aspects 1 to 21, wherein a linear dimensional change in the component before curing compared to after curing is less than 2%, preferably less than 1% in one, or two, or more linear dimensions.

Aspect 22a. The cured, shaped dielectric component of any one of aspects 1 to 21, wherein a volumetric dimensional change in the component before curing compared to after curing is less than 2%, preferably less than 1%.

Aspect 23. The cured, shaped dielectric component of any one of aspects 1 to 22, wherein the component is a dielectric resonator antenna, a dielectric portion of a dielectric resonator antenna, an electromagnetic waveguide, a dielectric electromagnetic lens, a radio-frequency component, a microwave component, an mm-wave component, a terahertz component, or an optical component.

Aspect 24. The cured, shaped dielectric component of any one of aspects 1 to 23, wherein the component is a dielectric electromagnetic lens, preferably a dielectric electromagnetic lens configured to operate at a frequency greater than 5 GHz and less than 300 GHz.

Aspect 25. A circuit material or circuit substrate comprising the cured, shaped dielectric component of any one of aspects 1 to 24.

Aspect 26. A method of making the cured, shaped dielectric component of any one of aspects 1 to 24, the method comprising: compounding a composite comprising a thermoplastic polymer having a low processing temperature, an optional crosslinking co-agent, an optional cure initiator, an optional additive composition, and a ceramic filler composition; melting the compounded composite to form a melt; shaping the melt to form a shaped article; and exposing the shaped article to radiation to generate sufficient free radicals in the thermoplastic polymer and crosslink at least a portion of the thermoplastic polymer to form the cured, shaped dielectric component.

Aspect 27. The method of aspect 26, further comprising forming the shaped article onto a substrate, masking at least a portion of the shaped article to the irradiation, and exposing the unmasked portion of the shaped article to the irradiation to form the cured, shaped dielectric component.

Aspect 28: The method of aspect 27, wherein shaping comprises molding, or forming a layer, preferably molding.

The articles, compositions, and methods can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

The terms "a" and "an" do not denote a limitation of quantity, but rather denote the presence of at least one of the referenced items. The term "or" means "and/or" unless clearly indicated otherwise by context. Reference throughout the specification to "an aspect," ""another aspect," "some aspects," and so forth, means that a particular element (e.g., feature, structure, step, or characteristic) described in connection with the embodiment is included in at least one embodiment described herein, and may or may not be present in other embodiments. In addition, it is to be understood that the described elements may be combined in any suitable manner in the various embodiments. The terms "first," "second," and the like as used herein do not denote any order, quantity, or importance, but rather are used to distinguish one element from another. The term "combination" is inclusive of blends, mixtures, alloys, reaction products, and the like. Also, "at least one of" or "a combination thereof" are open, and means that the list is inclusive of each element individually, as well as combinations of two or more elements of the list, and combinations of at least one element of the list with like elements not named Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears. The endpoints of all ranges directed to the same component or property are inclusive of the endpoints, are independently combinable, and include all intermediate points and ranges. For example, ranges of "up to 25 wt %, or 5 to 20 wt %" is inclusive of the endpoints and all intermediate values of the ranges of "5 to 25 wt %," such as 10 to 23 wt %, etc.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. As used herein, the term "(meth)acryl" encompasses both acryl and methacryl groups. As used herein, the term "(iso)cyanurate" encompasses both cyanurate and isocyanurate groups.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A cured, shaped dielectric component, comprising a crosslinked product of a composite comprising
    a thermoplastic polymer,
    an optional crosslinking co-agent,
    an optional cure initiator,
    an optional additive composition, and
    a ceramic filler composition;
    wherein the cured, shaped dielectric component has
        a permittivity of 1.1 to 20 at 10 GHz, and
        wherein the cured, shaped dielectric component has no melt flow index when tested at 190° C., 2.16 kg, in accordance with ASTM D1238-20.

2. The cured, shaped dielectric component of claim 1, wherein the thermoplastic polymer has a melt flow index of less than 5 grams per 10 minutes measured at 190° C., 2.16 kg, in accordance with ASTM D1238-20.

3. The cured, shaped dielectric component of claim 1, wherein the thermoplastic polymer comprises a polyethylene, a polypropylene, a polymethylpentene, a fluorinated ethylene propylene copolymer, a polynorbornene, a styrene-ethylene-propylene-styrene block copolymer, or a combination thereof.

4. The cured, shaped dielectric component of claim 1, wherein the thermoplastic polymer comprises a low-density polyethylene or a linear low-density polyethylene.

5. The cured, shaped dielectric component of claim 1, wherein the crosslinked product comprises a residue of a crosslinking co-agent.

6. The cured, shaped dielectric component of claim 1, wherein the crosslinked product comprises no residue of a crosslinking co-agent; and wherein the thermoplastic polymer comprises a thermoplastic polymer that self-crosslinks upon irradiation.

7. The cured, shaped dielectric component of claim 1, wherein the cure initiator is present and has an initiation temperature greater than a processing temperature of the thermoplastic polymer.

8. The cured, shaped dielectric component of claim 1, wherein all of the crosslinking co-agent, the cure initiator, and the additive composition are present.

9. The cured, shaped dielectric component of claim 1, wherein the crosslinking co-agent is present and comprises triallyl cyanurate, triallyl isocyanurate, triallyl phosphate, polybutadiene, zinc diacrylate, zinc dimethacrylate, divinyl benzene, vinyl terminated polyphenylene ether oligomers, m-phenylene dimaleimide, trimethylol propane trimethacrylate, tetramethylene glycol diacrylate, trifunctional acrylic ester, dipentaerythritol pentaacrylate, or a combination thereof.

10. The cured, shaped dielectric component of claim 1, wherein the additive composition is present and comprises an antioxidant, a metal deactivator, a process aide, an adhesion promoter, or a combination thereof.

11. The cured, shaped dielectric component of claim 1, wherein the ceramic filler comprises fumed silica, titanium dioxide, barium titanate, strontium titanate, corundum, wollastonite, $Ba_2Ti_9O_{20}$, hollow ceramic spheres, boron nitride, aluminum nitride, silicon carbide, beryllia, alumina, alumina trihydrate, magnesia, mica, talc, nanoclay, magnesium hydroxide, solid glass spheres, hollow glass spheres, or a combination thereof.

12. The cured, shaped dielectric component of claim 1, wherein the ceramic filler has a multimodal particle size distribution, wherein a peak of a first mode of the multimodal particle size distribution is at least seven times that of a peak of a second mode of the multimodal particle size distribution.

13. The cured, shaped dielectric component of claim 1, wherein the composite before crosslinking comprises
    50 to 95 wt % of the thermoplastic polymer,
    0 to 10 wt % of the crosslinking co-agent,
    0 to 5 wt % the cure initiator,
    0 to 2 wt % of the additive composition, and
    5 to 50 wt % of the ceramic filler composition,
    each based on the total weight of the composite before crosslinking, and wherein the total is 100 wt %, and
    wherein the permittivity of the cured, shaped dielectric component is 1.1 to 6, measured at 10 GHz.

14. The cured, shaped dielectric component of claim 1, wherein the composite before crosslinking comprises
    10 to 50 wt % of the thermoplastic polymer,
    0 to 10 wt % of the crosslinking co-agent,
    0 to 5 wt % the cure initiator,
    0 to 2 wt % of the additive composition, and
    50 to 90 wt % of the ceramic filler composition,
    each based on the total weight of the composite before crosslinking, and wherein the total is 100 wt %, and
    wherein the permittivity of the cured, shaped dielectric component is greater than 6, measured at 10 GHz.

15. The cured, shaped dielectric component of claim 1, wherein a linear dimensional change in the component before curing compared to after curing is less than 2% in any or all linear dimensions.

16. The cured, shaped dielectric component of claim 1, wherein the component is a dielectric resonator antenna, a dielectric portion of a dielectric resonator antenna, an electromagnetic waveguide, a dielectric electromagnetic lens, a radio-frequency component, a microwave component, an mm-wave component, a terahertz component, or an optical component.

17. The cured, shaped dielectric component of claim 1, wherein the component is a dielectric electromagnetic lens, preferably a dielectric electromagnetic lens configured to operate at a frequency greater than 5 GHz and less than 300 GHz.

18. A circuit material or circuit substrate comprising the cured, shaped dielectric component of claim 1.

19. A method of making the cured, shaped dielectric component of claim 1, the method comprising:
   compounding a composite comprising the thermoplastic polymer, the optional crosslinking co-agent, the optional cure initiator, the optional additive composition, and the ceramic filler composition;
   melting the compounded composite to form a melt;
   shaping the melt to form a shaped article; and
   exposing the shaped article to radiation to generate sufficient free radicals in the thermoplastic polymer and crosslink at least a portion of the thermoplastic polymer to form the cured, shaped dielectric component.

20. A cured, shaped dielectric component, comprising a crosslinked product of a composite comprising
   10 to 95 wt % of a thermoplastic polymer having a melt flow index of less than 5 grams per 10 minutes measured at 190° C., 2.16 kg, in accordance with ASTM D1238-20,
   0.25 to 10 wt % of a crosslinking co-agent,
   0.01 to 5 wt % of a cure initiator,
   0.0001 to 2 wt % of a additive composition, and
   5 to 90 wt % of a ceramic filler composition comprising silica, titanium dioxide, or a combination thereof,
   each based on the total weight of the composite before crosslinking, and wherein the total is 100 wt %,
wherein the cured, shaped dielectric component has
   a permittivity of 1.1 to 20 at 10 GHz measured in accordance with "Stripline Test for Permittivity and Loss Tangent at X-Band" test method IPC-TM-650 2.5.5.5 at a temperature of 23 to 25° C., and
   wherein the cured, shaped dielectric component has no melt flow index when tested at 190° C., 2.16 kg, in accordance with ASTM D1238-20.

* * * * *